(12) United States Patent
Kurota

(10) Patent No.: US 11,616,935 B2
(45) Date of Patent: Mar. 28, 2023

(54) INFORMATION GENERATION METHOD, INFORMATION GENERATION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/469,315

(22) Filed: Sep. 8, 2021

(65) Prior Publication Data

US 2022/0078383 A1    Mar. 10, 2022

(30) Foreign Application Priority Data

Sep. 9, 2020   (JP) .............................. JP2020-151096

(51) Int. Cl.
   *G03B 21/14*    (2006.01)
   *H04N 9/31*     (2006.01)
   *G06T 3/00*     (2006.01)

(52) U.S. Cl.
   CPC ......... *H04N 9/3185* (2013.01); *G03B 21/147* (2013.01); *G06T 3/0056* (2013.01); *H04N 9/3194* (2013.01)

(58) Field of Classification Search
   CPC ........ G03B 21/14; G03B 21/147; H04N 9/31; H04N 9/3194; H04N 9/3185; G06T 3/00; G06T 3/0056; G06T 3/40
   See application file for complete search history.

(56) References Cited

U.S. PATENT DOCUMENTS

| 2022/0076372 | A1* | 3/2022 | Kurota | ...................... G06T 7/73 |
| 2022/0078384 | A1* | 3/2022 | Kurota | ............... G01B 11/2513 |
| 2022/0191443 | A1* | 6/2022 | Kurota | ................. H04N 9/3185 |

FOREIGN PATENT DOCUMENTS

| JP | 2006-33357 A | 2/2006 |
| JP | 2010-271580 A | 12/2010 |
| JP | 2010-283674 A | 12/2010 |
| JP | 2015-192310 A | 11/2015 |

* cited by examiner

*Primary Examiner* — William C. Dowling
(74) *Attorney, Agent, or Firm* — Oliff PLC

(57) ABSTRACT

There is provided an information generation method including, identifying a correspondence relationship between a projector coordinate system and a camera coordinate system, receiving a first operation of designating a first display area representing an arrangement destination of a projection object which is projected on a projection target in a first coordinate system which is one of the camera coordinate system or the projector coordinate system, transforming the first display area into a second display area representing an arrangement destination of the projection object in a second coordinate system which is another of the camera coordinate system or the projector coordinate system based on the correspondence relationship, receiving a second operation of changing at least one of a shape or a position of the second display area, and generating information for changing at least one of a shape or a position of the projection object in accordance with the second operation.

7 Claims, 8 Drawing Sheets

INFORMATION GENERATION METHOD, INFORMATION GENERATION SYSTEM, AND NON-TRANSITORY COMPUTER-READABLE STORAGE MEDIUM STORING PROGRAM

The present application is based on, and claims priority from JP Application Serial Number 2020-151096, filed Sep. 9, 2020, the disclosure of which is hereby incorporated by reference herein in its entirety.

BACKGROUND

1. Technical Field

The present disclosure relates to an information generation method, an information generation system, and a non-transitory computer-readable storage medium storing a program.

2. Related Art

It is widely performed to project a projection image from a projector to a projection target having a three-dimensional shape, such as projection mapping. Further, it has been proposed to take an image of the projection target in the state in which the projection image is projected thereon with a camera, and then use the taken image for formation, setting, or the like of the projection image. For example, in JP-A-2006-33357 (Document 1), there is described a method of setting the projection image using a camera smaller in the number of pixels than the projection image of the projector. In the method disclosed in Document 1, based on a relative relationship between coordinates of a grid pattern on the taken image which can be obtained by taking an image of the projection target in the state in which a grid pattern image is projected thereon from the projector, and coordinates of the grid pattern on the grid pattern image, there is obtained a correspondence relationship between positions of pixels on a projector coordinate system and positions of pixels on a camera coordinate system. It should be noted that the projector coordinate system means a coordinate system representing a position on the projection image of the projector. The camera coordinate system means a coordinate system representing a position on the taken image of the camera.

A projection image for projection mapping typically includes a variety of projection objects to be projected on the projection target having a three-dimensional shape. Since an image approximate to the taken image of the projection target in the state in which the projection image is projected thereon is reflected on the eyes of a viewer, it is important to confirm the shape and the position of a display area in the camera coordinate system. However, conventionally, it is common that the setting of the display area to be the arrangement destination of the projection objects in the projection image and so on are performed in the projector coordinate system, and it is not achievable to set the display area while checking the shape and the position of the display area in the camera coordinate system.

SUMMARY

In view of the problems described above, an information generation method according to the present disclosure includes steps of identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera, receiving a first operation of designating a first display area representing an arrangement destination of a projection object which is projected on the projection target from the projector in a first coordinate system which is one of the camera coordinate system or the projector coordinate system, transforming the first display area into a second display area representing an arrangement destination of the projection object in a second coordinate system which is another of the camera coordinate system or the projector coordinate system based on the correspondence relationship, receiving a second operation of changing at least one of a shape or a position of the second display area, and generating information for changing at least one of the shape or the position of the projection object in accordance with the second operation.

Further, in view of the problems described above, an information generation system according to the present disclosure includes an input device, and at least one processor. The processor executes steps of identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera, receiving a first operation of designating a first display area representing an arrangement destination of a projection object which is projected on the projection target from the projector in a first coordinate system which is one of the camera coordinate system or the projector coordinate system, transforming the first display area into a second display area representing an arrangement destination of the projection object in a second coordinate system which is another of the camera coordinate system or the projector coordinate system based on the correspondence relationship, receiving a second operation of changing at least one of a shape or a position of the second display area, and generating information for changing at least one of the shape or the position of the projection object in accordance with the second operation.

Further, in view of the problems described above, a non-transitory computer-readable storage medium according to the present disclosure stores a program for making a computer execute steps of identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera, receiving a first operation of designating a first display area representing an arrangement destination of a projection object which is projected on the projection target from the projector in a first coordinate system which is one of the camera coordinate system or the projector coordinate system, transforming the first display area into a second display area representing an arrangement destination of the projection object in a second coordinate system which is another of the camera coordinate system or the projector coordinate system based on the correspondence relationship, receiving a second operation of changing at least one of a shape or a position of the second display area, and generating information for changing at least one of the shape or the position of the projection object in accordance with the second operation.

DESCRIPTION OF EXEMPLARY EMBODIMENTS

Some embodiments of the present disclosure will hereinafter be described with reference to the drawings. The embodiments described hereinafter are provided with a variety of technically preferable limitations. However, the embodiments of the present disclosure are not limited to the aspects described below.

1. First Embodiment

Figure 1:
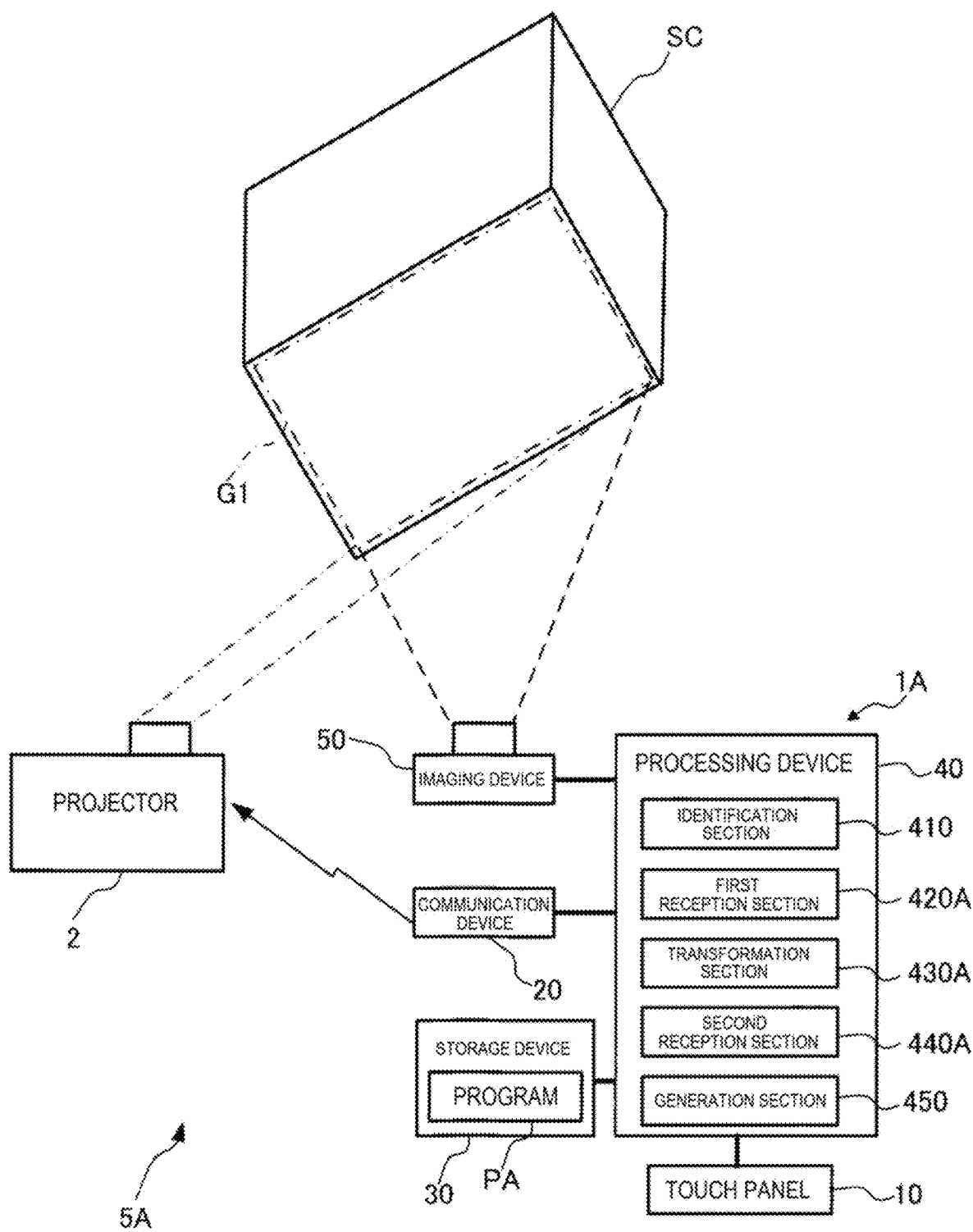
FIG. 1 is a block diagram showing a configuration example of an image display system 5A including an information generation device 1A for executing an information generation method according to a first embodiment of the present disclosure.

FIG. 1 is a block diagram showing a configuration example of an image display system 5A including an information generation device 1A for executing an information generation method according to a first embodiment of the present disclosure. In the image display system 5A, there is included a projector 2 which communicates with the information generation device 1A besides the information generation device 1A. The projector 2 projects a projection image G1 corresponding to image data supplied from the information generation device 1A on a surface of a projection target SC. In FIG. 1, although the detailed illustration is omitted, the projector 2 is provided with a light source, three display panels as a light modulation device, a projection lens, and a display panel drive section. The three display panels respectively correspond to colors of red, green, and blue. In the present embodiment, the display panels are each a liquid crystal light valve. The display panel drive section controls transmittance of the light in each of the three display panels described above in accordance with the image data supplied from the information generation device 1A. The projector 2 modulates light emitted from the light source with the three display panels to form image light, and then projects the image light from the projection lens to thereby display the projection image G1 on the surface of the projection target SC. The projection target SC in the present embodiment is a rectangular solid body as shown in FIG. 1, but can have a three-dimensional shape constituted by polygons coupled to each other such as a triangular pyramidal shape or a quadrangular pyramidal shape, or a three-dimensional shape having a curved surface.

The information generation device 1A is, for example, a smartphone. The information generation device 1A has an imaging function, and a communication function of communicating with the projector 2. When the information generation device 1A and the projector 2 are network-connected to each other, the information generation device 1A communicates with the projector 2 to obtain projector information from the projector 2. In the projector information, there are included resolution information and compression format information representing a compression format which can be decompressed in the projector 2. The resolution information is information representing resolution of the display panel in the projector 2. The resolution information is used when generating a measurement pattern for measuring a position of the projection image to be projected on the projection target SC by the projector 2. Although the detail will be described later, in the present embodiment, a binary code pattern is used as the measurement pattern. The compression format information is used for determination of the compression format of measurement pattern data when compressing the measurement pattern data representing the measurement pattern, and then transmitting the result from the information generation device 1A to the projector 2. It is desirable for the compression format used when compressing the measurement pattern data and then transmitting the result from the information generation device 1A to the projector 2 to be a lossless compression format such as run-length, LZH, PNG, or GIF.

The information generation device 1A generates the measurement pattern data representing each of the plurality of measurement patterns using the resolution information obtained from the projector 2, and then provides the measurement pattern data thus generated to the projector 2. The projector 2 projects respective images of the plurality of measurement patterns represented by the measurement pattern data provided from the information generation device 1A on the projection target SC. It should be noted that it is possible for the projector 2 to generate the measurement pattern data based on a command which is transmitted from the information generation device 1A to the projector 2, and in this case, there is no need to include the compression format information in the projector information. According to the aspect in which the measurement pattern data is generated in the projector 2, communication time for transmitting the measurement patterns from the information generation device 1A to the projector 2 is reduced. The information generation device 1A prompts a user to take an image of the projection target SC in the state in which the image of the measurement pattern is projected thereon by the projector 2 for each of the measurement patterns. The information generation device 1A takes an image of the projection target SC in the state in which the image of the measurement pattern is projected thereon using an imaging function in accordance with an operation of the user.

The information generation device 1A identifies a correspondence relationship between a projector coordinate system and a camera coordinate system based on the plurality of taken images thus taken and the images of the plurality of measurement patterns. The projector coordinate system means a coordinate system representing a position on the projection image by the projector 2. As an example of the projector coordinate system, there can be cited a two-dimensional coordinate system taking an upper left corner of the projection image as an origin. The camera coordinate system means a coordinate system representing a position on the taken image. As a specific example of the camera coordinate system, there can be cited a two-dimensional coordinate system taking an upper left corner of the taken image as an origin. Identifying the correspondence relationship between the projector coordinate system and the camera coordinate system means generating a transformation matrix for projective transformation from one coordinate system to the other coordinate system.

In the present embodiment, a display area to be an arrangement destination of a projection object in the projection image is designated in the camera coordinate system. Further, by using the correspondence relationship between the projector coordinate system and the camera coordinate system, it is possible to transform the display area of the projection object designated in the camera coordinate system into a display area in the projector coordinate system, and thus, change at least one of a position and a shape of the display area in the projector coordinate system. When an accuracy of the correspondence relationship between the camera coordinate system and the projector coordinate system is low, when the display area is designated in the camera coordinate system, there is a possibility that the display area is shifted in the projector coordinate system. The purpose of changing at least one of the position and the shape of the display area designated in the camera coordinate system in the projector coordinate system is to correct the shift of the display area caused by the low accuracy of the correspondence relationship between the camera coordinate system and the projector coordinate system.

As shown in FIG. 1, the information generation device LA includes a touch panel 10, a communication device 20, a storage device 30, a processing device 40, and an imaging device 50. The communication device 20 is a wireless communication module or a wired communication module. When the communication device 20 is the wired communication module, the communication device 20 is connected to the projector 2 via a communication line. The connection between the information generation device 1A and the projector 2 can be a direct connection without intervention of a relay device such as a wireless access point device or a router, or can also be an indirect connection via a relay device. When the communication device 20 is the wireless communication module, an ad-hoc connection can be cited as a specific example of the direct connection, and an access-point connection via a wireless access point device can be cited as a specific example of the indirect connection. Further, when the communication device 20 is the wired communication module, a peer-to-peer connection can be cited as a specific example of the direct connection, and a connection via a wired router or a wired hub can be cited as a specific example of the indirect connection. The communication device 20 communicates with the projector 2 under the control by the processing device 40. The imaging device 50 is a camera. The imaging device 50 takes an image under the control by the processing device 40, and supplies image data representing the taken image to the processing device 40.

The touch panel 10 is a device in which a display device for displaying an image and an input device to which information by the user is input are integrated with each other. The input device is, for example, a contact sensor like a transparent sheet. The input device is disposed so as to cover a display surface of the display device. The input device detects a touch position using a capacitance identified by an object which makes contact with the input device and the input device, and then outputs data representing the touch position thus detected to the processing device 40. Thus, operation content of the user to the touch panel 10 is transmitted to the processing device 40.

The storage device 30 is a recording medium which can be read by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 30, there is stored a program PA to be executed by the processing device 40. The volatile memory in storage device 30 is used by the processing device 40 as a work area when executing the program PA. The program PA can be referred to as an "application program," "application software," or an "app." The program PA is obtained from, for example, a server not shown via the communication device 20, and is then stored in the storage device 30. The program PA can be stored in advance in the storage device 30.

The processing device 40 is configured including a processor such as a CPU (Central Processing Unit). The processing device 40 can be formed of a single processor, or can also be formed of a plurality of processors. The processing device 40 retrieves the program PA from the nonvolatile memory to the volatile memory taking the fact that the operation instructing the start of the execution of the program PA is made on the touch panel 10 as a trigger, and then starts the execution of the program PA. The processing device 40 which is currently operating in accordance with the program PA functions as an identification section 410, a first reception section 420A, a transformation section 430A, a second reception section 440A, and a generation section 450. The identification section 410, the first reception section 420A, the transformation section 430A, the second reception section 440A, and the generation section 450 shown in FIG. 1 are each a software module realized by making the processing device 40 operate in accordance with the program PA.

The identification section 410 identifies the correspondence relationship between the projector coordinate system and the camera coordinate system based on the image of the measurement pattern projected from the projector 2 and the taken image of the projection target SC in the state in which the image of the measurement pattern is projected thereon. The image of the measurement pattern to be projected from the projector 2 is an example of a first image in the present disclosure. The taken image of the projection target SC in the state in which the image of the measurement pattern is projected thereon is an example of a second image in the present disclosure.

In the more detailed description, the identification section 410 obtains the projector information taking the fact that the start of the identification is instructed by an operation to the touch panel 10 under the situation in which the information generation device 1A and the projector 2 are network-connected to each other as a trigger. Subsequently, the identification section 410 generates the measurement pattern data from the resolution information included in the projector information. The identification section 410 controls the projector 2 so as to sequentially project the plurality of measurement patterns represented by the measurement pattern data. Further, the identification section 410 prompts the user to take an image of each of the plurality of measurement patterns sequentially projected on the projection target SC, and makes the imaging device 50 perform imaging in accordance with an operation of the user. Then, the identification section 410 identifies the correspondence relationship between the projector coordinate system and the camera coordinate system based on the images of the plurality of measurement patterns and the plurality of taken images taken by the imaging device 50.

More specifically, the identification section 410 generates a transformation matrix for performing the projective transformation of the coordinates of the measurement pattern in the taken image taken by the imaging device 50 into the coordinates of the measurement pattern in the display device of the projector 2 based on the images of the plurality of measurement patterns and the plurality of taken images. The transformation matrix is also used when performing deformation for realizing a geometric correction of the projection image to be projected on the projection target SC. In the present embodiment, when projecting the projection image from the projector 2, the image data of the projection image including the projection object on which the geometric correction has been performed using the transformation matrix described above is provided from the information generation device 1A to the projector 2, and the projector 2 projects the image in accordance with the image data.

As described above, in the present embodiment, the binary code pattern is used as the measurement pattern. The binary code pattern means an image for expressing the coordinate of the display device using a binary code. The binary code is a technique of expressing a value of each of digits when expressing an arbitrary numerical value with a binary number using ON/OFF of a switch. When using the binary code pattern as the measurement pattern, an image to be projected by the projector 2 corresponds to the switch described above, and a corresponding number of images to the number of digits of the binary number representing the coordinate value become necessary. Further, separate images are required respectively for the X coordinate and the Y coordinate. For example, when the resolution of the display panel of the projector 2 is 120×90, since 120 and 90 are each expressed by a binary number in seven digits, seven images become necessary for expressing the X coordinate, and seven images become necessary for expressing the Y coordinate.

Figure 2:
FIG. 2 is a diagram showing an example of measurement patterns in the embodiment.

Further, it is generally known that when using the binary code pattern as the measurement pattern, the robustness of the measurement deteriorates due to an influence of a disturbance light such as illumination. Therefore, when using the binary code pattern as the measurement pattern, it is common to additionally use a complementary pattern in order to suppress the influence of the disturbance light to increase the robustness of the measurement. The complementary pattern means an image obtained by flipping white and black. Hereinafter, the binary code pattern in which 1 is represented by white and 0 is represented by black is called a "positive pattern," and the complementary pattern in which the relationship is flipped is called a "negative pattern." In the present embodiment, when the resolution represented by the resolution information is 120×90, as shown in FIG. 2, the measurement pattern data representing 14 positive patterns and 14 negative patterns, totally 28 measurement patterns, is generated by the identification section 410. Although the binary code patterns are used as the measurement patterns in the present embodiment, there can be used other structured light such as dot patterns, rectangular patterns, polygonal patterns, checker patterns, gray code patterns, phase-shift patterns, or random dot patterns.

The first reception section 420A receives a first operation. The first operation in the present disclosure is an operation of designating a first display area to be an arrangement destination of the projection object which is projected on the projection target SC from the projector 2 in a first coordinate system which is one of the camera coordinate system and the projector coordinate system. In the present embodiment, the first coordinate system is the camera coordinate system. The first reception section 420A makes the display device of the touch panel 10 display the taken image of the projection target SC in order to prompt the user to execute the first operation. Regarding the taken image, it is possible to divert any of the plurality of taken image taken when identifying the correspondence relationship between the camera coordinate system and the projector coordinate system. As a specific example of the first operation, there can be cited an operation of sequentially designating vertexes of the first display area so as to draw an outline of the first display area using taps or the like to the touch panel 10 in the state of displaying the taken image. As a specific example of the first operation of designating the first display area having a rectangular shape, there can be cited an operation of tapping vertexes of the rectangular shape in the order of a vertex on an upper left corner, a vertex on an upper right corner, a vertex on a lower right corner, and a vertex on a lower left corner. Further, as another specific example of the first operation, there can be cited an operation of swiping the touch panel 10 so as to draw an outline of the first display area.

Figure 3:
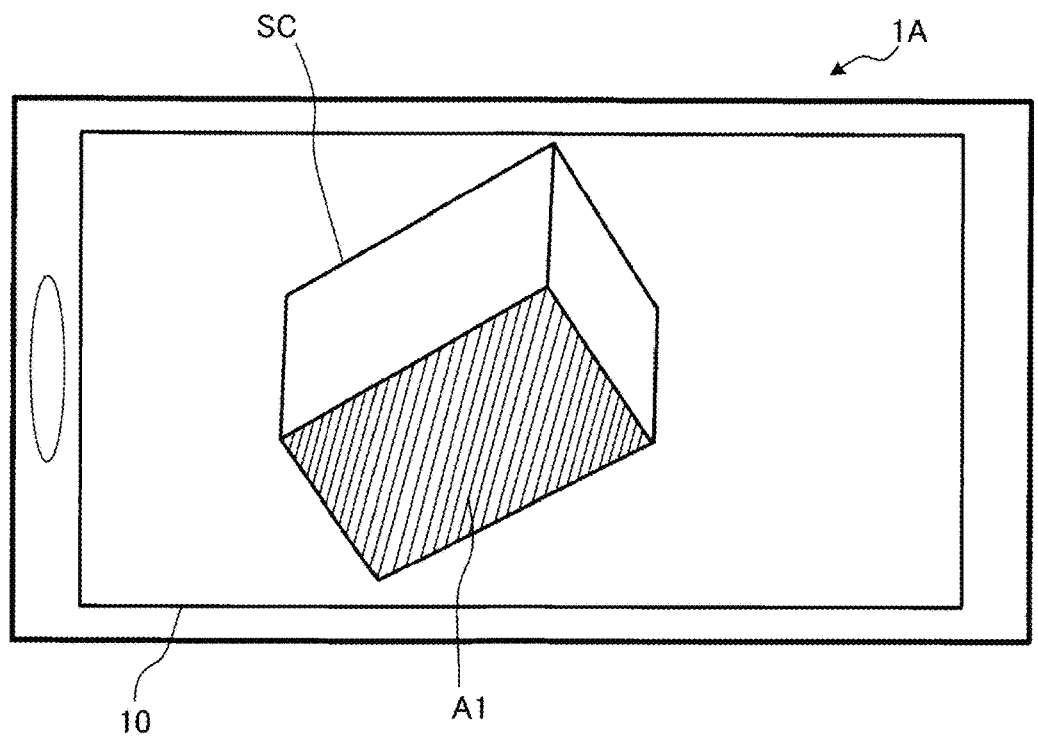
FIG. 3 is a diagram showing an example of an image which a processing device 40 of the information generation device 1A makes a display device display in order to prompt execution of a first operation.

FIG. 3 is a diagram showing an example of a taken image which the first reception section 420A makes the display device display in order to prompt execution of the first operation. An area provided with diagonal-line hatching in FIG. 3 is an example of a first display area A1 set by the first operation. In the example shown in FIG. 3, one of the surfaces of the projection target SC is set as the first display area A1. The first reception section 420A generates first vertex information representing positions in the first coordinate system of the vertexes of the first display area and an order in which the vertexes are connected in accordance with the first operation. As a specific example of the first vertex information, there can be cited information in which information representing coordinates of the vertexes in the first coordinate system, and information representing the order of connecting the vertexes are associated with each other and are arranged. As a specific example of the information representing the order of connecting the vertexes, there can be cited IDs having values increasing in the order of the touches of the vertexes.

The transformation section 430A transforms the first display area designated by the first operation into a second display area to be the arrangement destination of the projection object in a second coordinate system as the other of the camera coordinate system and the projector coordinate system based on the correspondence relationship identified by the identification section 410. The second coordinate system in the present embodiment is the projector coordinate system. In other words, the transformation section 430A transforms the first display area designated in the camera coordinate system into the second display area in the projector coordinate system based on the correspondence relationship identified by the identification section 410. Specifically, the transformation section 430A transforms the information representing the coordinate included in the first vertex information into information representing a coordinate in the second coordinate system using the transformation matrix identified by the identification section 410 to thereby generate second vertex information.

The second reception section 440A receives a second operation. The second operation is an operation of changing, in the second coordinate system, at least one of the position and the shape of the display area designated in the first coordinate system. As described above, the first coordinate system in the present embodiment is the camera coordinate system, and the second coordinate system is the projector coordinate system. In other words, the second operation in the present embodiment is an operation of changing, in the projector coordinate system, at least one of the position and the shape of the display area designated in the camera coordinate system. The change in position of the display area in the present disclosure includes a translation of the display area and a rotation of the display area. Further, the change in shape of the display area in the present disclosure includes a deformation into a similarity shape different in size, and a deformation into an arbitrary shape other than the similarity shape. As a specific example of the second operation, there can be cited an operation of selecting a vertex, a side, or a whole of the display area using a click of a tap, and then translating or rotating the display area, or an operation of deforming the display area into a similarity shape.

Further, in order to prompt the user to execute the second operation, the second reception section 440A makes the display device of the touch panel 10 display the projection image including the second display area in the state in which the inside of the outline is filled with a first color and the outline is drawn with a second color. As a specific example of the first color, there can be cited a red color, and as a specific example of the second color, there can be cited a blue color. The outline of the second display area is drawn with the second color in the present example, but can be drawn with the first color. Further, the inside of the outline of the second display area is filled with the first color in the present embodiment, but filling with the first color can be omitted. Further, it is possible to omit the drawing of the outline of the second display area to express the second display area only by drawing of the vertexes represented by the second vertex information. Further, the second reception section 440A updates the second vertex information, and at the same time, updates the display image by the display device in accordance with the second operation thus received every time the second operation is received.

In the more detailed description, the second reception section 440A generates an image which has the same size as the size represented by the resolution information obtained from the projector 2, or which has the same aspect ratio as the aspect ratio represented by the resolution information, and which is filled with a third color. As a specific example of the third color, there can be cited a black color. When the image having the same size as the size represented by the resolution information can be displayed by the display device of the touch panel 10, it is sufficient to adopt the former aspect, and when it cannot be displayed, it is sufficient to adopt the latter aspect. In the present embodiment, an upper left corner of the image filled with the third color becomes an origin of the projector coordinate system.

Figure 4:
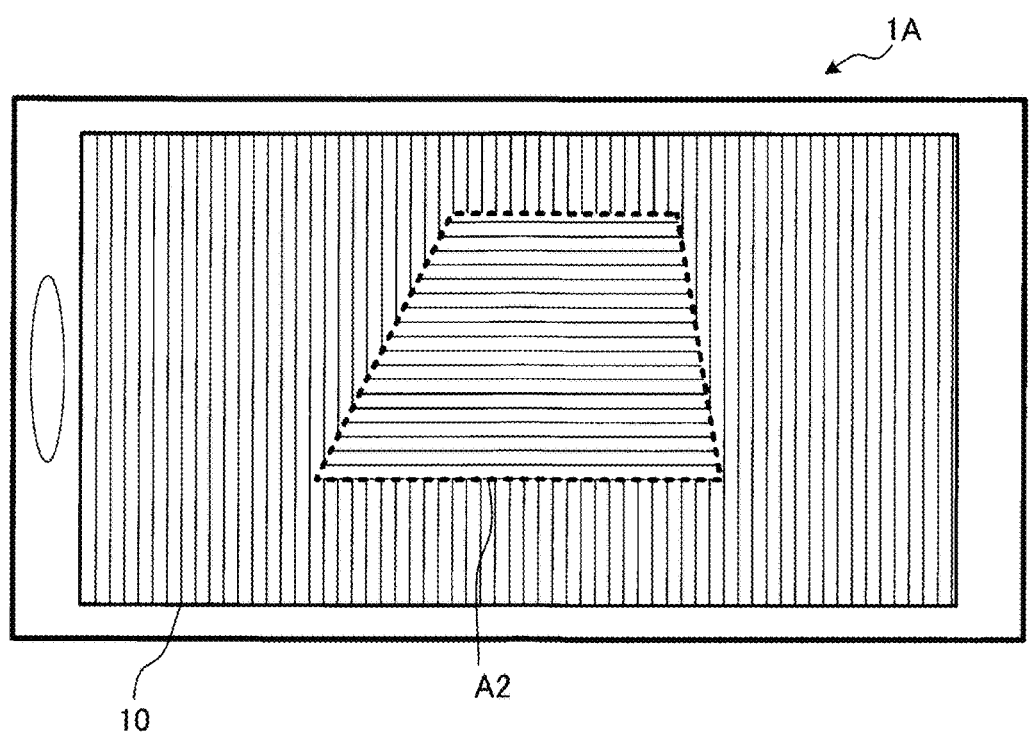
FIG. 4 is a diagram showing an example of an image which the processing device 40 makes the display device display in order to prompt execution of a second operation.

Subsequently, the second reception section 440A makes the display device of the touch panel 10 display an image obtained by drawing the vertexes the coordinates of which are represented by the second vertex information on the image with the third color, further drawing the outline obtained by connecting the vertexes with line segments in the order represented by the second vertex information with the second color, and further filling the inside of the outline with the first color as the projection image. FIG. 4 is a diagram showing an example of the projection image including a second display area A2. In FIG. 4, the vertical-line hatching represents the third color, and the horizontal-line hatching represents the first color. Further, in FIG. 4, the dotted line represents a line drawn with the second color. Further, in the projection image shown in FIG. 4, the area filled with the third color corresponds to an area to which the image light is not emitted from the projector 2.

The generation section 450 generates information for changing at least one of the shape and the position of the projection object in the projection image in accordance with the second operation. When the projection object to be disposed in the second display area is designated, the processing device 40 generates the image data of the projection image obtained by changing at least one of the shape and the position of the projection object in accordance with the information, and then transmits the image data to the projector 2. By the projector 2 projecting the projection image represented by the image data on the projection target SC, it is possible for the user to confirm a result of the change by the second operation described above using the actual projection image.

Figure 5:
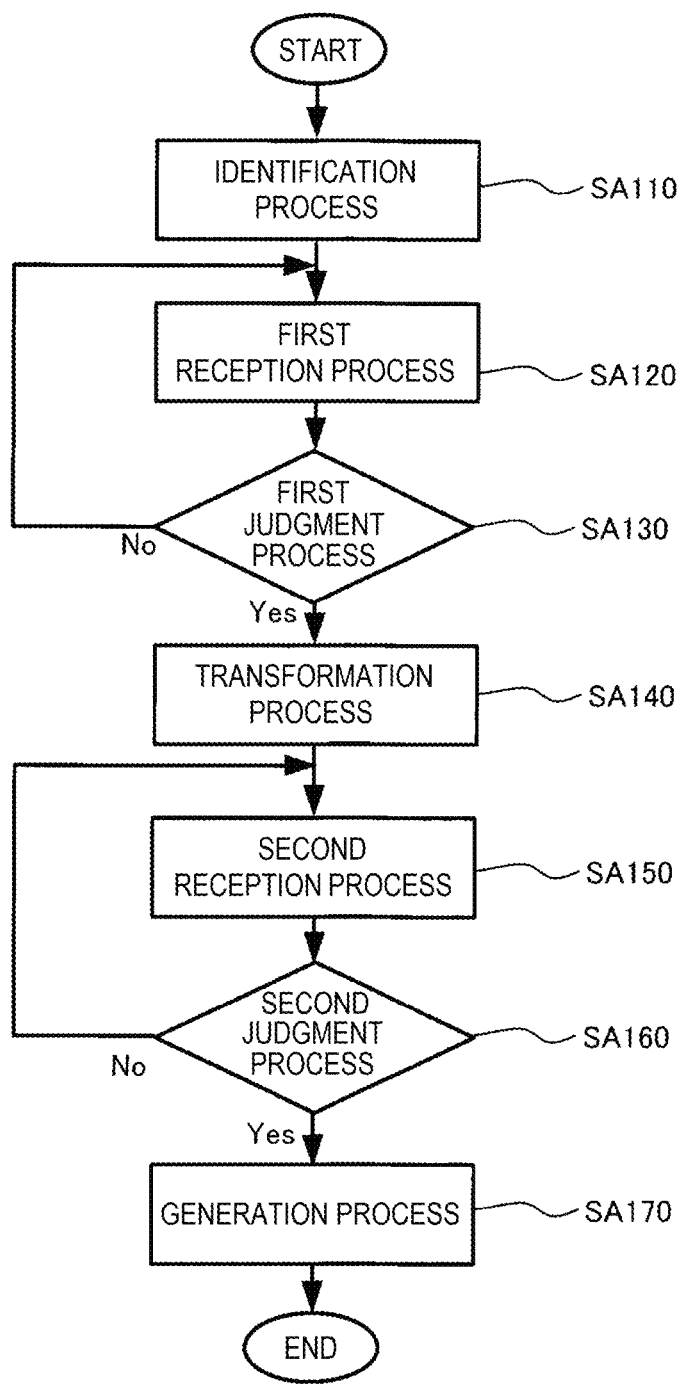
FIG. 5 is a flowchart showing a flow of the information generation method to be executed by the processing device 40 in accordance with a program PA.

Further, the processing device 40 which is operating in accordance with the program PA executes the information generation method according to the first aspect of the present disclosure. FIG. 5 is a diagram showing a flow of the information generation method to be executed by the processing device 40 in accordance with the program PA. As shown in FIG. 5, the information generation method of the first aspect of the present disclosure includes an identification process SA110, a first reception process SA120, a first judgment process SA130, a transformation process SA140, a second reception process SA150, a second judgment process SA160, and a generation process SA170.

In the identification process SA110, the processing device 40 functions as the identification section 410. In the identification process SA110, the processing device 40 requests transmission of the projector information to the projector 2 taking the fact that the start of the identification is instructed by the user using the operation to the touch panel 10 as a trigger, and obtains the projector information sent back from the projector 2. The processing device 40 generates the plurality of measurement patterns based on the resolution information included in the projector information obtained from the projector 2. The processing device 40 identifies the correspondence relationship between the projector coordinate system and the camera coordinate system based on the taken image of the projection target SC in the state in which each of the plurality of measurement patterns is projected thereon, namely the plurality of taken images, and the plurality of images of measurement patterns.

The first reception process SA120 is a process to be executed taking the fact that the start of setting of the display area is instructed by the user using the operation to the touch panel 10 as a trigger. It should be noted that when disposing the plurality of projection objects in the projection image, it is sufficient to repeat the first reception process SA120 and the subsequent processes the same number of times as the number of the projection objects to be disposed in the projection image. In the first reception process SA120, the processing device 40 functions as the first reception section 420A. In the first reception process SA120, the processing device 40 makes the display device of the touch panel 10 display the taken image in order to prompt the user to execute the first operation. When the first operation is performed on the touch panel 10, the processing device 40 generates the first vertex information described above. When setting of the first display area has been completed, the user instructs completion of the setting of the display area to the information generation device 1A using an operation to the touch panel 10.

In the first judgment process SA130, the processing device 40 judges whether or not the completion of the setting of the display area is instructed using the operation to the touch panel 10. When a judgment result in the first judgment process SA130 is "No," the processing device 40 executes the first reception process SA120 once again. When the judgment result in the first judgment process SA130 is "Yes," the processing device 40 executes the transformation process SA140. In the transformation process SA140, the processing device 40 functions as the transformation section 430A. In the transformation process SA140, the processing device 40 transforms the first vertex information generated in the first reception process SA120 into the second vertex information using the transformation matrix identified in the identification process SA110.

In the second reception process SA150, the processing device 40 functions as the second reception section 440A. In the second reception process SA150, in order to prompt the user to execute the second operation, the processing device 40 makes the display device of the touch panel 10 display the projection image including the second display area in which the inside of the outline is filled with the first color and the outline is drawn with the second color. In the second reception process SA150, the processing device 40 updates the second vertex information in accordance with the second operation, and at the same time, updates the display image of the touch panel 10 in accordance with the second operation.

In the second judgment process SA160, the processing device 40 judges whether or not completion of the change of the display area is instructed using the operation to the touch panel 10. When the judgment result in the second judgment process SA160 is "No," the processing device 40 executes the second reception process SA150 once again. When the judgment result in the second judgment process SA160 is "Yes," the processing device 40 executes the generation process SA170. In the generation process SA170, the processing device 40 functions as the generation section 450. In the generation process SA170, the processing device 40 generates information for changing at least one of the shape and the position of the projection object in the projection image in accordance with the second operation.

According to the information generation device 1A related to the present embodiment, it becomes possible to change, in the projector coordinate system, the display area of the projection object set in the camera coordinate system. As described above, when an accuracy of the correspondence relationship between the camera coordinate system and the projector coordinate system is low, when the display area is designated in the camera coordinate system, there is a possibility that the display area is shifted in the projector coordinate system. According to the present embodiment, by changing, in the projector coordinate system, at least one of the position and the shape of the display area set in the camera coordinate system, it becomes possible to correct the shift to more accurately set the display area.

2. Second Embodiment

Figure 6:
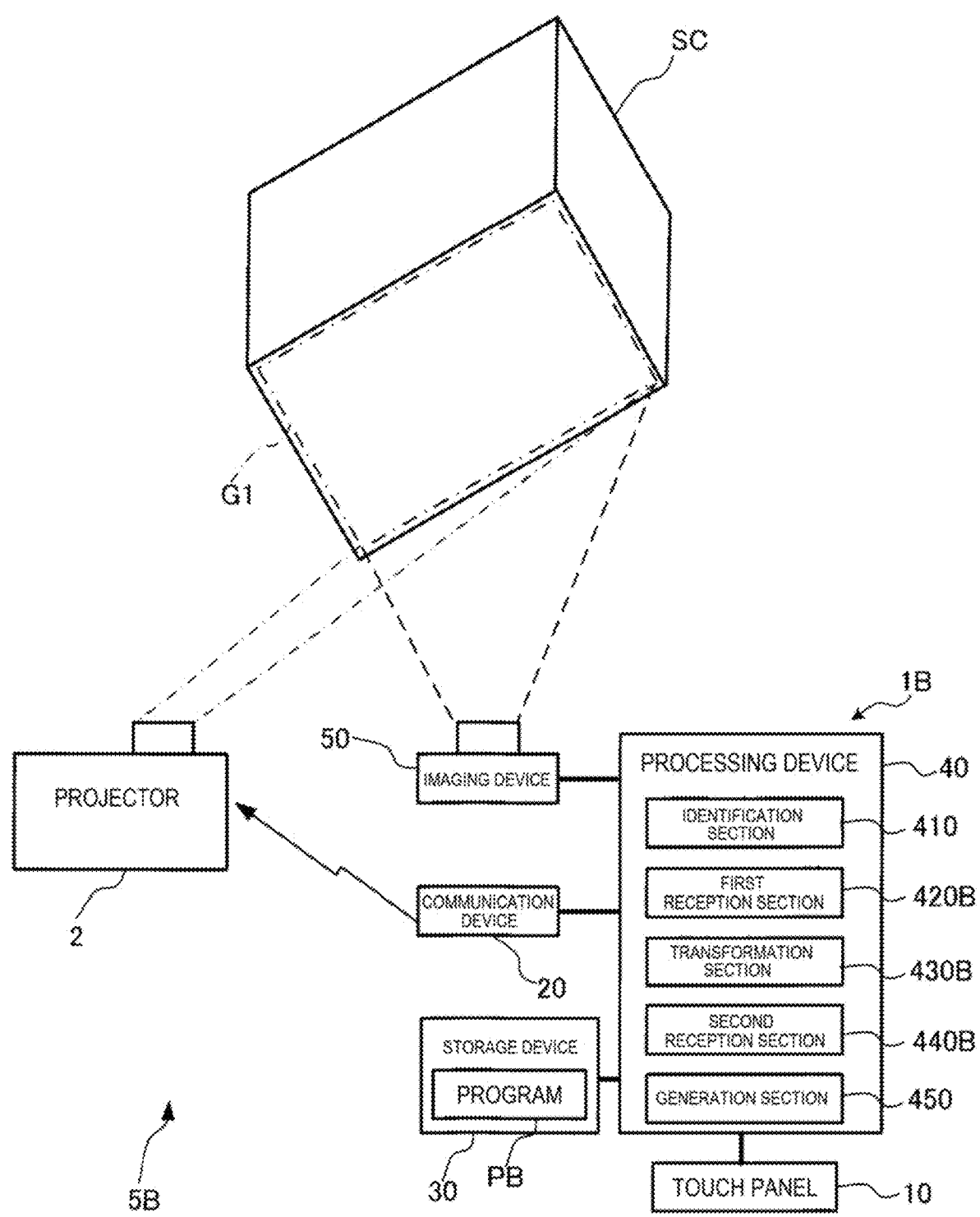
FIG. 6 is a block diagram showing a configuration example of an image display system 5B including an information generation device 1B for executing an information generation method according to a second embodiment of the present disclosure.

FIG. 6 is a block diagram showing a configuration example of an image display system 5B including an information generation device 1B for executing an information generation method according to a second embodiment of the present disclosure and the projector 2. A difference of the information generation device 1B from the information generation device 1A is that a program PB is stored in the storage device 30 instead of the program PA. The processing device 40 of the information generation device 1B executes the program PB to thereby function as the identification section 410, a first reception section 420B, a transformation section 430B, a second reception section 440B, and the generation section 450. The description will hereinafter be presented with a focus on the first reception section 420B, the transformation section 430B, and the second reception section 440B as the difference from the first embodiment.

The first reception section 420B is the same in the point that the first reception section 420B receives the first operation as the first reception section 420A in the first embodiment. The present embodiment is different from the first embodiment in the point that the first coordinate system is the projector coordinate system. The first reception section 420B makes the display device of the touch panel 10 display the projection image in order to prompt the user to execute the first operation similarly to the second reception section 440A in the first embodiment. In the more detailed description, the first reception section 420B makes display a black image which has the same size as the size represented by the resolution information obtained from the projector 2, or which has the same aspect ratio as the aspect ratio represented by the resolution information. As a specific example of the first operation in the present embodiment, there can be cited an operation of designating the vertexes of the first display area and the order in which the vertexes are connected with respect to the projection image. The first reception section 420B generates the first vertex information representing the vertexes of the first display area and the order in which the vertexes are connected in accordance with the first operation.

The transformation section 430B transforms the first display area as the display area in the first coordinate system into the second display area as the display area in the second coordinate system similarly to the transformation section 430A. Specifically, the transformation section 430B transforms the first vertex information representing the vertexes of the first display area and the order in which the vertexes are connected into the second vertex information representing the vertexes of the second display area and the order in which the vertexes are connected. It should be noted that the present embodiment is different from the first embodiment in the point that the first coordinate system is the projector coordinate system, and the second coordinate system is the camera coordinate system. The second reception section 440B receives the second operation of changing, in the second coordinate system, at least one of the position and the shape of the first display area designated by the first operation similarly to the second reception section 440A. The second reception section 440B makes the display device of the touch panel 10 display the taken image by the imaging device 50 in order to prompt the user to execute the second operation. In the more detailed description, the second reception section 440B makes the display device display the image of the second display area in which the vertexes are represented by the second vertex information so as to be superimposed on the taken image by the imaging device 50. It should be noted that the second reception section 440B updates the second vertex information, and at the same time, updates the display image by the display device in accordance with the second operation thus received every time the second operation is received similarly to the second reception section 440A.

Figure 7:
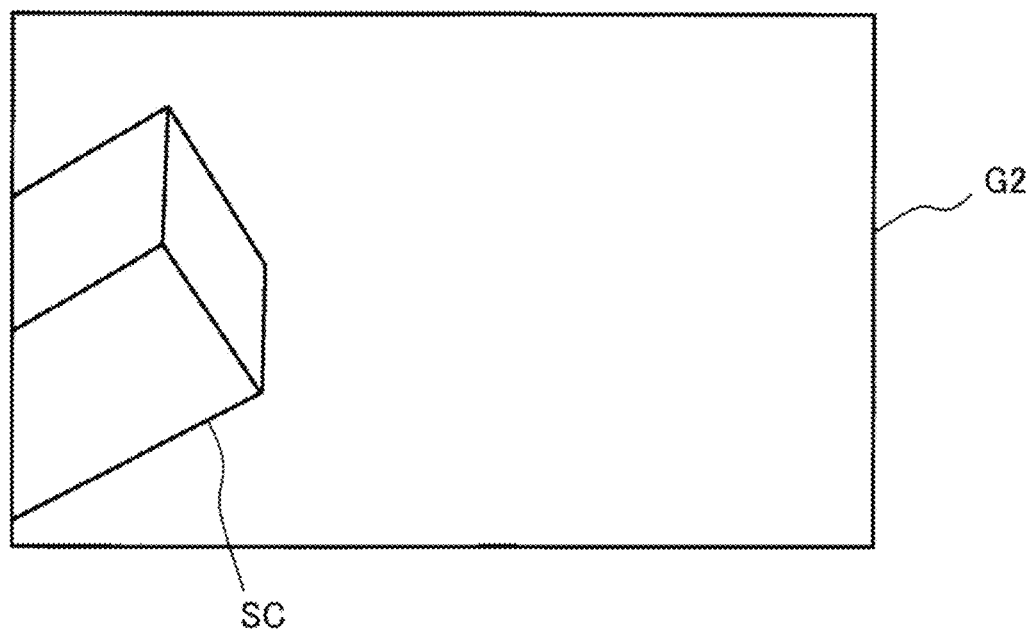
FIG. 7 is a diagram showing an example of a taken image by an imaging device 50.

Since the projection target SC in the present embodiment has a three-dimensional shape, there is a possibility that a part of the projection target SC fails to show up in the taken image. Further, as a taken image G2 shown in FIG. 7, a part of the projection target SC is excluded from the imaging range of the imaging device 50 in some cases. When a part of the projection target SC fails to show up in the taken image, and the first display area is sectioned into a first area corresponding to a portion of the projection target SC which shows up in the taken image, and a second area other than the first area, the transformation section 430B performs the transformation to the second display area in the following manner. The first area is made to correspond to the camera coordinate system by the transformation matrix generated by the identification section 410. Therefore, the transformation section 430B transforms the first area into a third area in the camera coordinate system using the transformation matrix. In contrast, the second area is not made to correspond to the camera coordinate system in the transformation matrix described above. Therefore, the transformation section 430B transforms the second area into a fourth area in the camera coordinate system based on the third area. Then, the second reception section 440B makes the display device display the third area and the fourth area as the second display area to prompt the second operation.

Figure 8:
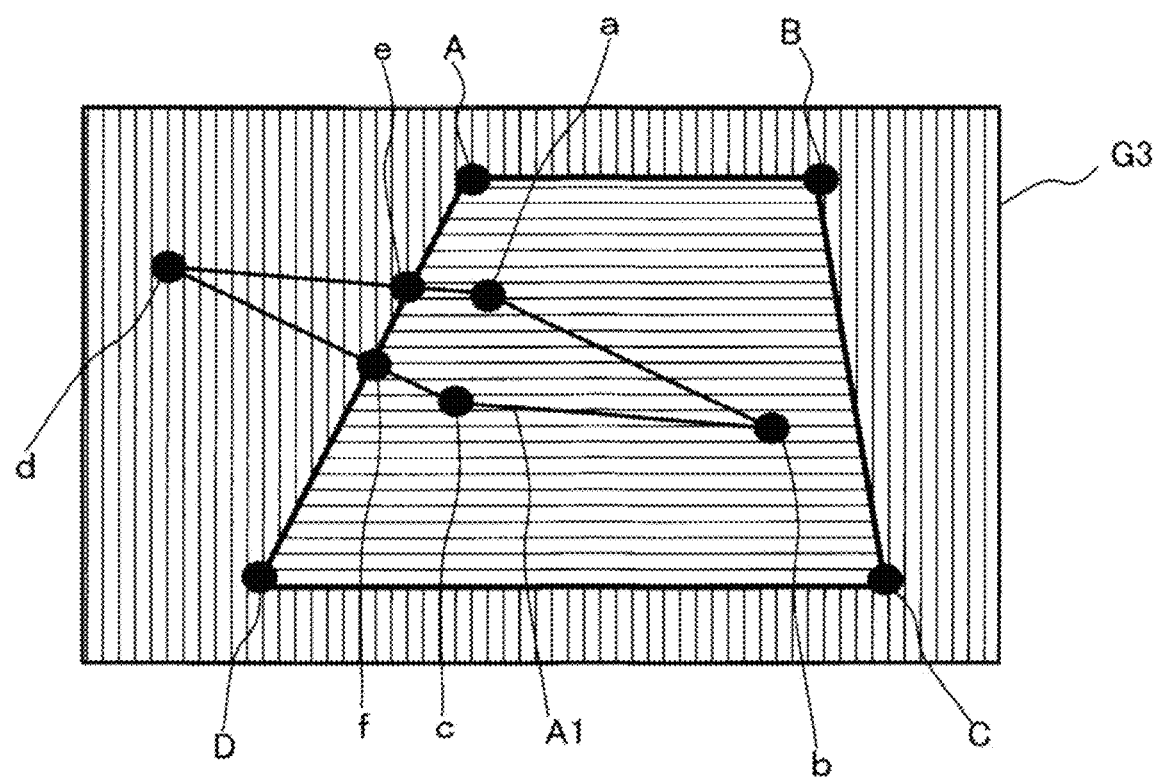
FIG. 8 is a diagram showing an example of a first display area A1 set in accordance with the first operation.

For example, it is assumed that in a projection image G3 shown in FIG. 8, a quadrangular area having vertexes A, B, C, and D is the area in which the correspondence relationship has already been identified, and the first display area having a quadrangular shape having vertexes a, b, c, and d is set by the first operation. In this case, a pentagonal area having vertexes a, b, c, f, and e corresponds to the first area, and a triangular area having the vertexes d, e, and f corresponds to the second area. It should be noted that the vertex e is an intersection point of a line segment DA and a line segment da, and the vertex f is an intersection point of the line segment DA and a line segment cd.

When the first display area A1 is set as shown in FIG. 8, the transformation section 430B calculates the coordinates in the camera coordinate system of the vertexes a, b, and c out of the four vertexes of the first display area A1 using the transformation matrix. Subsequently, the transformation section 430B obtains the line segments DA, da, and cd in the projector coordinate system to calculate the coordinates in the projector coordinate system of the vertex e and the vertex f. Subsequently, the transformation section 430B obtains the coordinates in the camera coordinate system of the vertex e and the vertex f using the transformation matrix, and then obtains a first straight line passing through the point a and the point e and a second straight line passing through the point c and the point f in the camera coordinate system. Then, the transformation section 430B obtains an intersection point of the first straight line and the second straight line, and sets the coordinate of the intersection point as the coordinate of the vertex d in the camera coordinate system.

Figure 9:
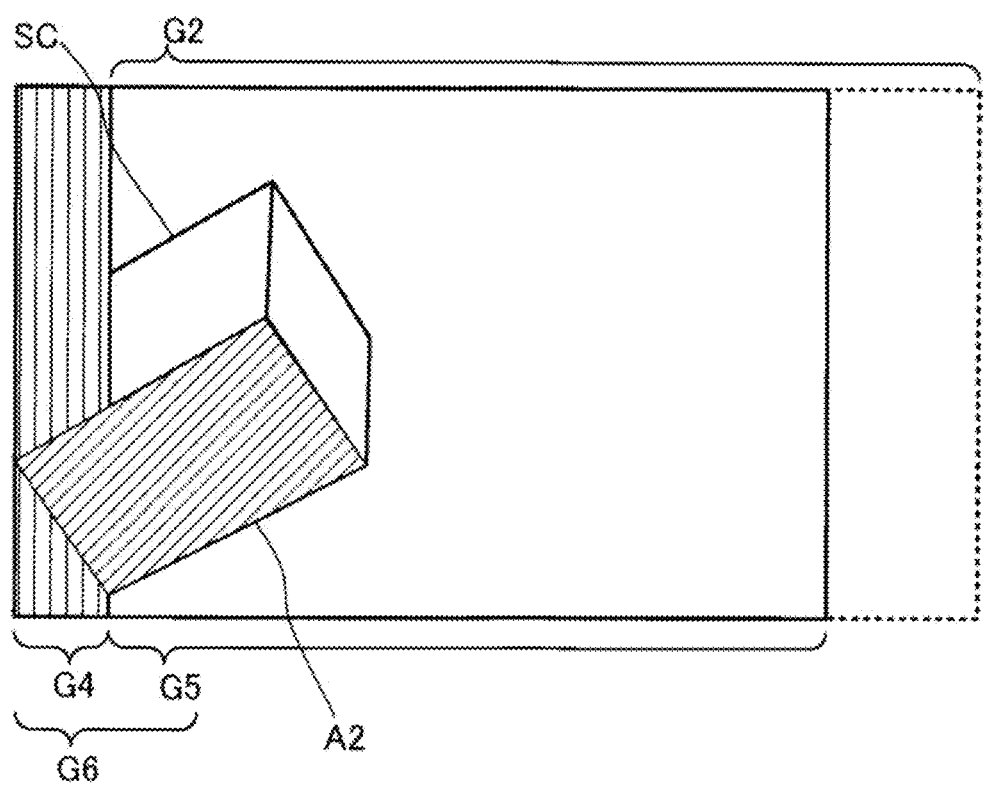
FIG. 9 is a diagram showing a display example of a second display area A2.

As shown in FIG. 9, the second reception section 440B makes the display device display the image of the second display area A2 so as to be superimposed on an image G6 consisting of an image G4 as a margin corresponding to the coordinate of the vertex d, and an image G5 clipped from the taken image G2 so as to be narrowed as much as the margin.

Figure 10:
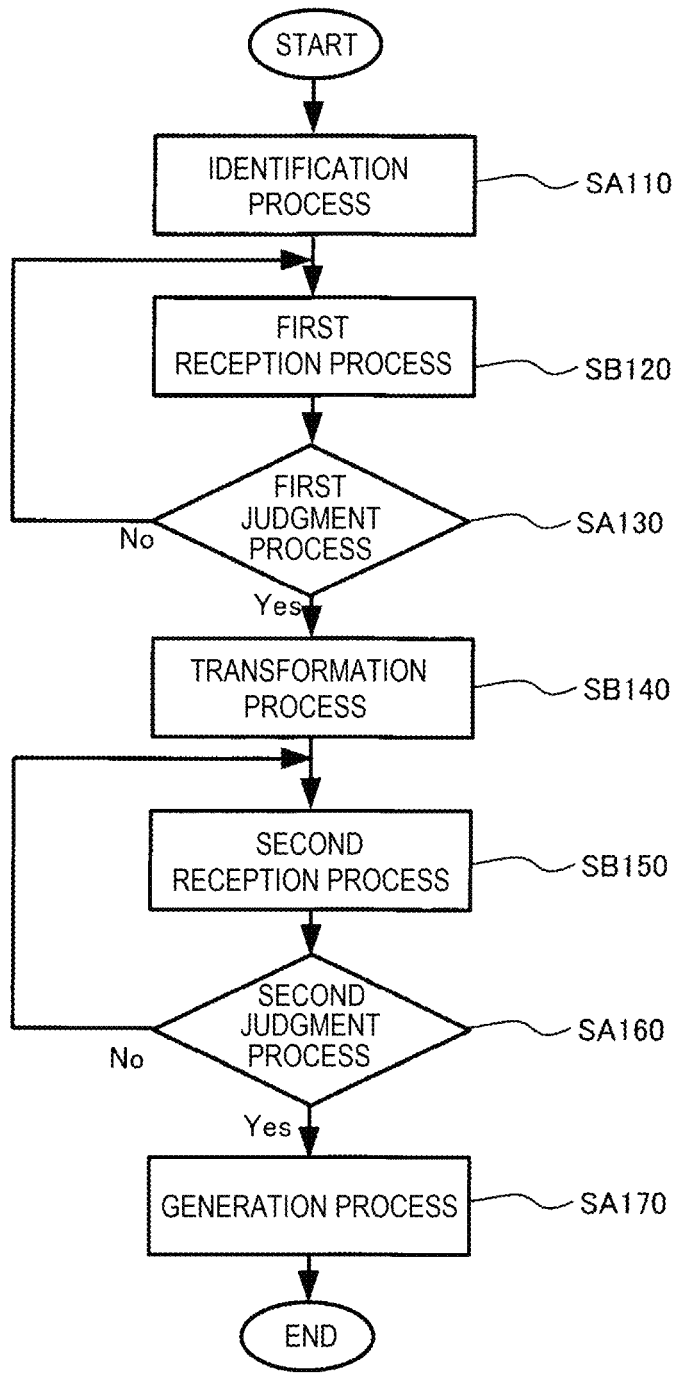
FIG. 10 is a flowchart showing a flow of the information generation method to be executed by the information generation device 1B in accordance with a program PB.

FIG. 10 is a flowchart showing a flow of the information generation method to be executed by the processing device 40 in accordance with the program PB. As is obvious from the comparison between FIG. 10 and FIG. 5, the information generation method according to the present embodiment is different from the information generation method according to the first embodiment in the point that a first reception process SB120 is provided instead of the first reception process SA120, the point that a transformation process SB140 is provided instead of the transformation process SA140, and the point that a second reception process SB150 is provided instead of the second reception process SA150. The description will hereinafter be presented with a focus on the first reception process SB120, the transformation process SB140, and the second reception process SB150 as the difference from the first embodiment.

The first reception process SB120 is executed taking the fact that the start of setting of the display area is instructed using an operation to the touch panel 10 as a trigger similarly to the first reception process SA120 in the first embodiment. It should be noted that when disposing the plurality of projection objects in the projection image, it is sufficient to repeat the first reception process SB120 and the subsequent processes the same number of times as the number of the projection objects to be disposed in the projection image. In the first reception process SB120, the processing device 40 functions as the first reception section 420B. In the first reception process SB120, the processing device 40 makes the display device of the touch panel 10 display the projection image in order to prompt the user to execute the first operation. In the present embodiment, the processing device 40 makes display a black image which has the same size as the size represented by the resolution information obtained from the projector 2, or which has the same aspect ratio as the aspect ratio represented by the resolution information as the projection image described above. When the first operation is performed on the touch panel 10, the processing device 40 generates the first vertex information described above. When setting of the first display area has been completed, the user instructs completion of the setting of the display area to the information generation device 1B using the operation to the touch panel 10. As described in the first embodiment, when the completion of the setting of the display area is instructed, the judgment result in the first judgment process SA130 becomes "Yes."

As shown in FIG. 10, the transformation process SB140 is executed when the judgment result in the first judgment process SA130 is "Yes." When the judgment result in the first judgment process SA130 is "No," the first reception process SB120 is executed once again. In the transformation process SB140, the processing device 40 functions as the transformation section 430B. In the transformation process SB140, the processing device 40 transforms the first display area into the second display area. Specifically, the processing device 40 transforms the first vertex information generated in the first reception process SB120 into the second vertex information using the transformation matrix identified in the identification process SA110.

In the second reception process SB150, the processing device 40 functions as the second reception section 440B. In the second reception process SB150, the processing device 40 makes the display device of the touch panel 10 display the taken image by the imaging device 50 in order to prompt the user to execute the second operation. In the more detailed description, the processing device 40 makes the display device display the image of the second display area in which the vertexes are represented by the second vertex information so as to be superimposed on the taken image by the imaging device 50. Further, in the second reception process SB150, the processing device 40 updates the second vertex information in accordance with the second operation, and at the same time, updates the display image of the touch panel 10 in accordance with the second operation.

According to the information generation device 1B related to the present embodiment, it becomes possible to change, in the camera coordinate system, the display area designated in the projection coordinate system. According to the present embodiment, it is possible to set the display area including the range which the imaging device 50 has failed to image, and even when a part of the projection target SC does not show up in the taken image, it becomes possible to change at least one of the shape and the position of the display area.

3. Modified Examples

Each of the embodiments can be modified as follows.

(1) The first operation in each of the embodiments is the operation of designating the vertexes of the first display area in sequence so as to draw the outline of the first display area using taps or the like. However, it is possible to make the user designate the first display area using a predetermined figure such as a variety of polygons or an ellipse. For example, when displaying a pull-down menu for selecting any of a predetermined plurality of types of figures, it is sufficient to define an operation of selecting one of the figures displayed in the pull-down menu, and an operation of changing at least one of the position and the shape of the figure thus selected as the first operation. Further, it is possible to identify the overall shape of the projection target SC or the shape of each of the surfaces of the projection target SC using edge detection or the like, and include the figure corresponding to the shape thus identified in the pull-down menu described above.

(2) In the second embodiment, when a part of the projection target SC does not show up in the taken image, and the first display area is sectioned into the first area and the second area, the first area is transformed into the third area using the transformation matrix, the second area is transformed into the fourth area based on the third area, and the third are and the fourth area constitute the second display area. However, it is possible to omit the transformation of the second area to the fourth area, and form the second display area only with the third area.

(3) It is possible to arrange that the information generation method in the first embodiment and the information generation method in the second embodiment can be performed in a switched manner. Specifically, it is sufficient to store the program PB in the storage device 30 of the information generation device 1A in advance in addition to the program PA, and to make the processing device 40 execute one of the program PA and the program PB in accordance with an instruction by the user.

(4) The information generation device 1A and the information generation device 1B are both the smart phones having the imaging device 50, but can be tablet terminals provided with an imaging device, or personal computers of a notebook type or a stationary type provided with the imaging device. When using the personal computer of the notebook type or the stationary type as the information generation device according to the present disclosure, it is possible to receive the first operation and the second operation using a mouse or a keyboard as the input device. Further, when the information generation device can obtain the taken image using data communication via a network such as LAN, the information generation device is not required to be provided with the imaging device. Further, in a computer system having a portable terminal such as a smartphone or a tablet terminal and a server device communicating therewith via a LAN or the Internet, it is possible to make a processing device of the server device function as the identification section 410, the transformation section 430A or the transformation section 430B, and the generation section 450, and make the portable terminal play a role of the input device for inputting the first operation and the second operation. The computer system is an example of the information generation system according to the present disclosure.

(5) The identification section 410, the first reception section 420A, the transformation section 430A, the second reception section 440A, and the generation section 450 in the first embodiment are each a software module, but some or all of the identification section 410, the first reception section 420A, the transformation section 430A, the second reception section 440A, and the generation section 450 can be hardware. As an example of the hardware, there can be cited a DSP (Digital Signal Processor), an ASIC (Application Specific Integrated Circuit), a PLD (Programmable Logic Device), and an FPGA (Field Programmable Gate Array). Even when some or all of the identification section 410, the first reception section 420A, the transformation section 430A, the second reception section 440A, and the generation section 450 are hardware, the same advantages as those of the first embodiment described above can be exerted. Regarding the first reception section 420B, the transformation section 430B, and the second reception section 440B in the second embodiment, some or all of them can similarly be hardware.

(6) In the first embodiment, the program PA has already been stored in the storage device 30. However, it is possible to manufacture or distribute the program PA alone. As a specific method of distributing the program PA, there can be cited an aspect of writing the program PA described above in a computer-readable recording medium such as a flash ROM (Read Only Memory) to distribute the program PA, and an aspect of distributing the program PA by downloading the program PA through a telecommunication line such as the Internet. By installing the program PA in a general information processing device such as a personal computer, and then operating a computer such as a CPU in the information processing device in accordance with the program, it becomes possible to make the information processing device function as the information generation device according to the present disclosure. It is also possible to similarly manufacture or distribute the program PB according to the second embodiment alone.

4. Aspects Understood from at Least One of Embodiments and Modified Examples

The present disclosure is not limited to the embodiments and the modified examples described above, but can be implemented in a variety of aspects within the scope or the spirit of the present disclosure. For example, the present disclosure can also be implemented in the following aspects.

The technical features in the embodiment described above corresponding to the technical features in each of the aspects described below can arbitrarily be replaced or combined in order to solve apart or the whole of the problem of the present disclosure, or to achieve some or all of the advantages of the present disclosure. Further, the technical feature can arbitrarily be eliminated unless described in the present specification as an essential element.

In order to solve the problems described hereinabove, an aspect of the information generation method according to the present disclosure includes the identification process SA110, the first reception process SA120, the transformation process SA140, the second reception process SA150, and the generation process SA170.

In the identification process SA110, the correspondence relationship between the projector coordinate system representing the position on the projection image to be projected by the projector and the camera coordinate system representing the position on the taken image taken by the camera based on the first image projected from the projector, and the second image obtained by imaging the projection target in the state in which the first image is projected thereon with the camera.

In the first reception process SA120, there is received the first operation of designating the first display area A1 to be the arrangement destination of the projection object which is projected on the projection target SC from the projector 2 in the first coordinate system which is one of the camera coordinate system and the projector coordinate system. More specifically, the first coordinate system is the camera coordinate system, and it is possible to make the display device of the touch panel 10 display the taken image of the projection target SC by the imaging device 50 to thereby prompt the execution of the first operation when receiving the first operation in the first reception process SA120.

In the transformation process SA140, the first display area A1 is transformed into the second display area A2 to be the arrangement destination of the projection object in the second coordinate system as the other of the camera coordinate system and the projector coordinate system based on the correspondence relationship identified in the identification process SA110. When the first coordinate system is the camera coordinate system, the second coordinate system is the projector coordinate system.

In the second reception process SA150, there is received the second operation for changing at least one of the shape and the position of the second display area A2. When receiving the second operation in the second reception process SA150, it is possible to make the display device of the touch panel 10 display the projection image to thereby prompt the execution of the second operation.

In the generation process SA170, the information for changing at least one of the shape and the position of the projection object is generated in accordance with the second operation. According to the information generation method related to the present aspect, it becomes possible to change, in the projector coordinate system, at least one of the shape and the position of the display area designated in the camera coordinate system, and it becomes possible to set the second display area A2 with high accuracy even when the accuracy of the correspondence relationship between the camera coordinate system and the projector coordinate system is low.

Another aspect of the information generation method according to the present disclosure can include the first reception process SB120 instead of the first reception process SA120, the transformation process SB140 instead of the transformation process SA140, and the second reception process SB150 instead of the second reception process SA150. More specifically, the first coordinate system is the projector coordinate system, and it is possible to make the display device of the touch panel 10 display the projection image to thereby prompt the execution of the first operation when receiving the first operation in the first reception process SB120. Further, when receiving the second operation in the second reception process SB150, it is possible to make the display device of the touch panel 10 display the taken image of the projection target SC by the imaging device 50 to thereby prompt the execution of the second operation. According to the present embodiment, it becomes possible to change, in the camera coordinate system, at least one of the position and the shape of the display area set in the projector coordinate system, and it becomes possible to set the display area so as to include the range which cannot be imaged by the camera.

In a more preferable aspect when the first coordinate system is the projector coordinate system, when a part of the projection target SC fails to show up in the taken image of the projection target SC by the imaging device 50, and the first display area A1 is sectioned into the first area corresponding to the portion of the projection target SC which shows up in the taken image and the second area other than the first area, the processing content in the transformation process SB140 and the second reception process SB150 can be as follows. In the transformation process SB140, the first area is transformed into the third area in the camera coordinate system based on the correspondence relationship, and the second area is transformed into the fourth area in the camera coordinate system based on the third area. In the second reception process SB150, the third area and the fourth area are displayed by the display device of the touch panel 10 as the second display area. According to the present aspect, even when a part of the projection target SC does not show up in the taken image, it becomes possible to change at least one of the shape and the position of the display area.

In order to solve the problems described hereinabove, an aspect of the information generation system according to the present disclosure is provided with the input device and the processing device 40. Further, the processing device 40 executes the identification process SA110, the first reception process SA120, the transformation process SA140, the second reception process SA150, and the generation process SA170, or the identification process SA110, the first reception process SB120, the transformation process SB140, the second reception process SB150, and the generation process SA170 described above. According also to the information processing system related to the present aspect, it becomes possible for at least one of the shape and the position of the display area designated in one of the camera coordinate system and the projector coordinate system to be changed in the other of the coordinate systems.

In the information generation system according to more preferable aspect, it is possible for the processing device 40 to make the projector 2 project the projection image in which at least one of the shape and the position of the projection object has been changed based on the information generated in accordance with the second operation. According to the present aspect, it becomes possible to make the user figure out the result of the change by the second operation using the projection image by the projector.

In order to solve the problems described hereinabove, an aspect of a non-transitory computer-readable storage medium storing a program according to the present disclosure makes a computer execute the identification process SA110, the first reception process SA120, the transformation process SA140, the second reception process SA150, and the generation process SA170 described above. Further, another aspect of the non-transitory computer-readable storage medium according to the present disclosure stores the program for making a computer execute the identification process SA110, the first reception process SB120, the transformation process SB140, the second reception process SB150, and the generation process SA170 described above. According to the non-transitory computer readable storage medium storing the program related to the present aspect, it becomes possible for at least one of the shape and the position of the display area designated in one of the camera coordinate system and the projector coordinate system to be changed in the other of the coordinate systems.

What is claimed is:

1. An information generation method comprising:
    identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera;
    receiving a first operation of designating a first display area representing an arrangement destination of a projection object which is projected on the projection target from the projector in a first coordinate system which is one of the camera coordinate system or the projector coordinate system;
    transforming the first display area into a second display area representing an arrangement destination of the projection object in a second coordinate system which is another of the camera coordinate system or the projector coordinate system based on the correspondence relationship;
    receiving a second operation of changing at least one of a shape or a position of the second display area; and
    generating information for changing at least one of a shape or a position of the projection object in accordance with the second operation.

2. The information generation method according to claim 1, further comprising:
    displaying the taken image of the projection target by the camera when receiving the first operation; and
    displaying the projection image when receiving the second operation, wherein
    the first coordinate system is the camera coordinate system.

3. The information generation method according to claim 1, further comprising:
    displaying the projection image when receiving the first operation; and
    displaying the taken image of the projection target by the camera when receiving the second operation, wherein
    the first coordinate system is the projector coordinate system.

4. The information generation method according to claim 3, wherein
    when a part of the projection target fails to show up in the taken image of the projection target by the camera, and the first display area is sectioned into a first area corresponding to a portion of the projection target which shows up in the taken image, and a second area other than the first area,
    the first area is transformed into a third area in the camera coordinate system based on the correspondence relationship,
    the second area is transformed into a fourth area in the camera coordinate system based on the third area, and
    the display device is made to display the third area and the fourth area as the second display area.

5. An information generation system comprising:
    an input device; and
    at least one processor which executes
        identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera,
        receiving a first operation of designating a first display area representing an arrangement destination of a projection object which is projected on the projection target from the projector in a first coordinate system which is one of the camera coordinate system or the projector coordinate system,
        transforming the first display area into a second display area representing an arrangement destination of the projection object in a second coordinate system which is another of the camera coordinate system or the projector coordinate system based on the correspondence relationship,
        receiving a second operation of changing at least one of a shape or a position of the second display area, and
        generating information for changing at least one of a shape or a position of the projection object in accordance with the second operation.

6. The information generation system according to claim 5, wherein
    the processor further executes making the projector project the projection image in which at least one of the shape or the position of the projection object was already changed based on information generated in accordance with the second operation.

7. A non-transitory computer-readable storage medium storing a program for making a computer execute a method comprising:
    identifying a correspondence relationship between a projector coordinate system representing a position on a projection image which is projected by a projector and a camera coordinate system representing a position on a taken image taken by a camera based on a first image projected from the projector and a second image obtained by imaging a projection target in a state in which the first image is projected on the projection target using the camera;
    receiving a first operation of designating a first display area representing an arrangement destination of a projection object which is projected on the projection target from the projector in a first coordinate system which is one of the camera coordinate system or the projector coordinate system;
    transforming the first display area into a second display area representing an arrangement destination of the projection object in a second coordinate system which is another of the camera coordinate system or the projector coordinate system based on the correspondence relationship;

receiving a second operation of changing at least one of a shape or a position of the second display area; and generating information for changing at least one of a shape or a position of the projection object in accordance with the second operation.

* * * * *